United States Patent
Harvey

(10) Patent No.: US 8,891,028 B2
(45) Date of Patent: Nov. 18, 2014

(54) SCREEN SPLITTER

(76) Inventor: Mark Harvey, San Diego, CA (US)

( * ) Notice: Subject to any disclaimer, the term of this patent is extended or adjusted under 35 U.S.C. 154(b) by 1728 days.

(21) Appl. No.: 11/308,340

(22) Filed: Mar. 17, 2006

(65) Prior Publication Data

US 2007/0215017 A1 Sep. 20, 2007

(51) Int. Cl.
*H04N 5/64* (2006.01)
*A63F 9/24* (2006.01)

(52) U.S. Cl.
USPC .......................................... 348/841; 463/47

(58) Field of Classification Search
USPC ................... 348/841, 51–54, 739, 832, 786; 108/157.1; 463/47; 353/97
See application file for complete search history.

(56) References Cited

U.S. PATENT DOCUMENTS

| | | | | |
|---|---|---|---|---|
| 5,435,557 A | * | 7/1995 | Coffey | 463/47 |
| D367,192 S | * | 2/1996 | Frattini | D6/487 |
| 6,079,709 A | * | 6/2000 | Ethridge et al. | 273/148 B |
| 2002/0010026 A1 | * | 1/2002 | York | 463/47 |
| 2003/0106474 A1 | * | 6/2003 | Buono | 108/131 |
| 2005/0274302 A1 | * | 12/2005 | Jin et al. | 108/126 |
| 2006/0094510 A1 | * | 5/2006 | Risso et al. | 463/46 |

* cited by examiner

*Primary Examiner* — Twyler Haskins
*Assistant Examiner* — Akshay Trehan
(74) *Attorney, Agent, or Firm* — Thomas J. Tighe

(57) ABSTRACT

A resiliently bendable planar panel has a side that when juxtaposed laterally with a video display screen traverses the width of the screen, and is supported by a plurality of legs. The panel includes sufficient area and form to partition the display into two vertically distinct sections from the visual perspectives of viewers of the screen whenever the side is laterally juxtaposed with the screen. Preferably each leg includes a device slidable up and down the leg for containing and supporting a marginal portion of the panel. Preferably the panel is fabric and includes a marginal bias urging the fabric to be taut, such as an expansion rod disposed in a marginal seam of the panel.

18 Claims, 11 Drawing Sheets

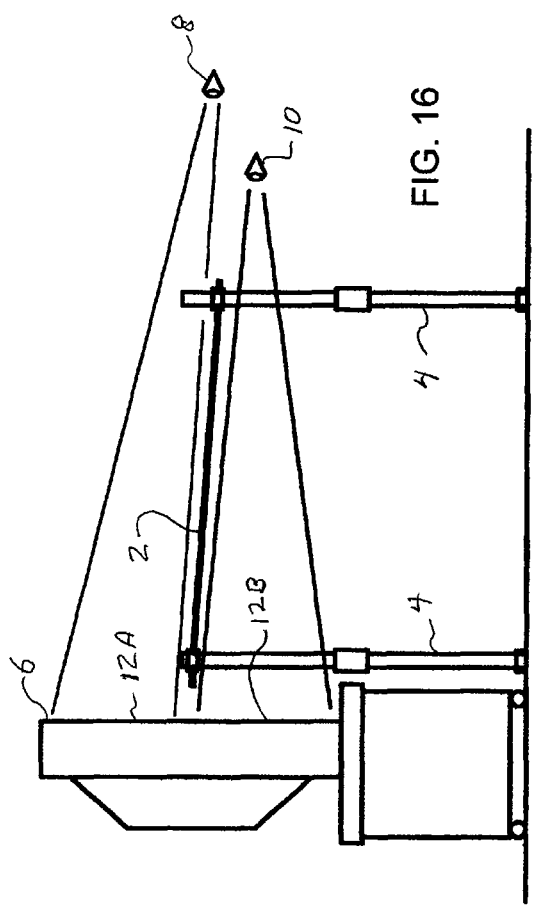

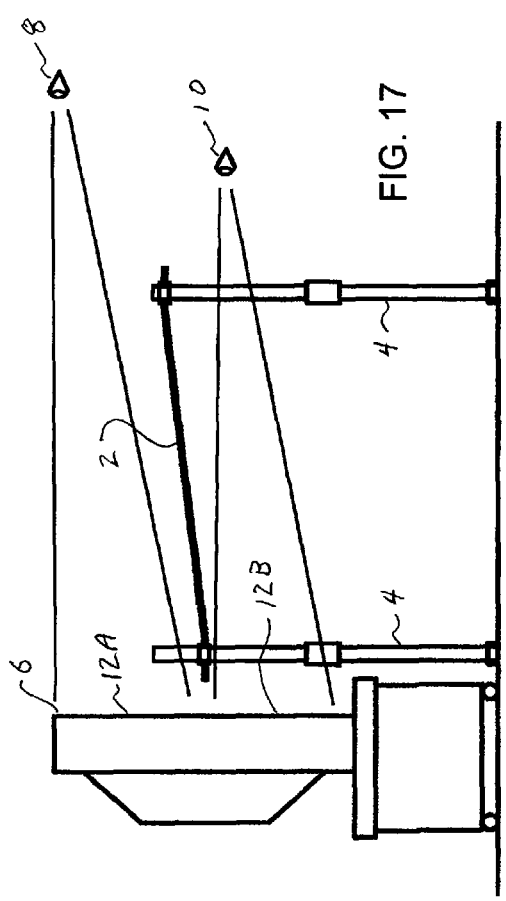

SCREEN SPLITTER

BACKGROUND OF THE INVENTION

This invention relates to a device for partitioning, i.e., splitting the field of view of a video display screen into two distinct viewable areas so that a viewer properly positioned to see one viewing area cannot see the other viewing area, and vice versa. As used in this specification the term "video screen" pertains to television screens, video projection screens, computer video monitor screens, and basically any video display.

With the continuing improvement in computer processing speeds, memory capacity, and software, video games have become more detailed and realistic. One popular feature of multiplayer video games is to simultaneously display the game from the perspective of each player on respective sectors or sections of the video screen. This feature is found in many racing and combat games where the players are competing against each other. However, if the game requires stealth tactics, such as in combat games, it is impossible to achieve stealth if one's opponent can view one's game display. Thus there has been a long felt need to for a device capable of splitting the view of a video display screen into two viewing areas so that a viewer properly positioned to see one viewing area cannot see the other viewing area, and vice versa. This invention solves this problem.

This invention allows two players, or two player groups, to play the same game and be able to see the game from their respective perspectives which are hidden from their competitor(s). This invention provides an adjustable partition that can be used to limit a video game's field of view to two separately viewable areas.

While this invention is advantageous to video game playing, as explained above, it is also advantageous in any situation or for any purpose in which it is desirable to split the field of view of a video display into two distinct viewable areas.

Other advantages and attributes of this invention will be readily discernable upon a reading of the text hereinafter.

SUMMARY OF THE INVENTION

An object of this invention is to provide a device for splitting the field of view of a video display to two separately viewable fields.

An object of this invention is to provide a device for splitting the field of view of a video game display to two separately viewable fields.

An additional object of this invention is to provide a device which will limit the field of view of a video viewer to no more than one sector of a video monitor screen.

An additional object of this invention is to provide a device which will limit the field of view of a video game player to only one of a two sectors of a video monitor screen.

An additional object of this invention is to provide a free-standing device that will achieve the objects described herein.

An additional object of this invention is to provide an adjustable, free-standing device that will achieve the objects described herein.

A further object of this invention is to provide an adjustable, free-standing, collapsible device that will achieve the objects described herein.

These objects, and other objects expressed or implied in this document, are accomplished by a video display screen splitter including a resiliently bendable planar panel having a side that when juxtaposed laterally with the screen traverses the width of the screen, a plurality of legs for supporting the panel, and wherein the panel includes sufficient area and form to partition the display into two vertically distinct sections from the visual perspectives of viewers of the screen whenever the side is laterally juxtaposed with the screen. Preferably each leg includes a device slidable up and down the leg for containing and supporting a marginal portion of the panel; the preferred embodiment describes a bracket that brackets a marginal portion of the panel. Preferably the panel is fabric and includes a marginal bias urging the fabric to be taut, such as an expansion rod disposed in a marginal seam of the panel.

BRIEF DESCRIPTION OF THE DRAWINGS

FIGS. 15-17 are diagrammatic illustrations of this invention fully erected and in use before a video display screen, the partition panel being substantially horizontal in FIG. 15, the panel being declined toward viewers in FIG. 16 allowing the viewers to be closer vertically, the panel being inclined toward the viewers in FIG. 17 due to a relatively lower video display.

DESCRIPTION OF THE PREFERRED EMBODIMENT

Referring to FIGS. 1-3, and 15-17, a fully assembled screen splitter includes a partition 2 supported by a plurality of legs 4. The partition is illustrated to be a flat trapezoidal sheet, preferably a foldable panel biased to be unfolded and planarly taut by a relatively thin flexible rod that is confined in a closed, marginal seam generally fully around the panel. Preferably the rod is made from a steel alloy having a thickness of 5 mm×1.2 mm and having a memory that urges the rod to be straight. It is this expansion rod that keeps the panel planarly taut, however the rod can also be made from any non-metallic, memory-retaining material that can function as described herein. Such rods are commonly incorporated in self-erecting, i.e., pop-up tents, the rods biasing the tents to be in their erected states. Preferably the partition can be any thin, opaque material but is preferably fabric which can be slightly stretched. Since the rod and panel fabric are flexible the panel can be twist folded into a compact circular form for storage. The panel is supported selectively at its preferably rounded corners or alternatively around it's periphery by a plurality of legs 4, and as will be explained further below, the legs can be disassembled for storage.

Figure 15:
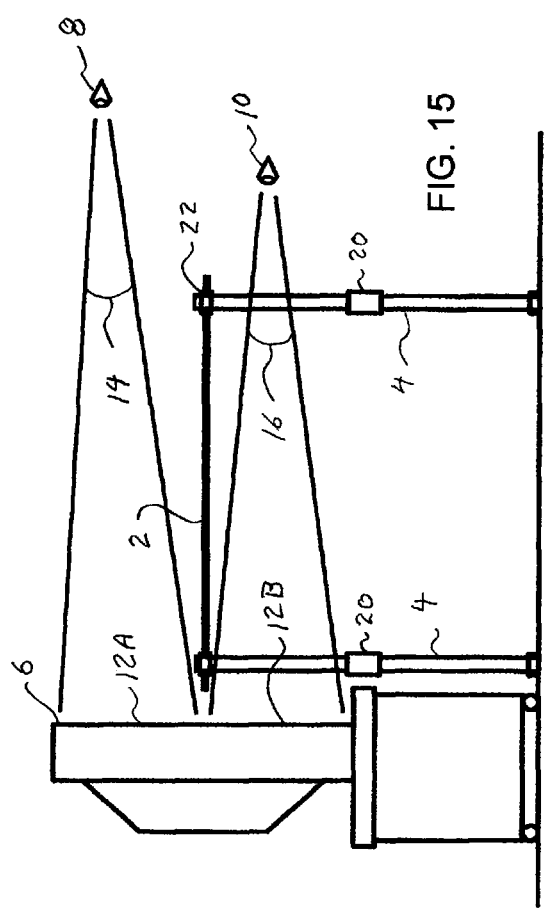

In operation (as best shown in FIGS. 15-17) the erected partition 2, supported by its legs, is placed generally edgewise directly in front of a video display screen 6 such that a side is juxtaposed laterally with the screen. In FIG. 15 the partition panel is oriented in generally a horizontal plane approximately through the center of the video display screen, whereas in FIG. 16 the panel is declined toward two viewers represented symbolically by eyeballs, 8 and 10, and in FIG. 17 the panel is inclined toward the two viewers. In all three figures a first viewer 8 and a second viewer 10 are shown to be in vertically spaced from each other such that viewer 8 can only observe that portion of the video display, sector 12A, being displayed above the partition, while viewer 10 can only observe that portion of the video display, sector 12B, being displayed below the partition. The viewers' vertical angles of vision, 14 and 16, are limited by the partition to their respective display sectors, 12A and 12B respectively. Because of the disposition of the screen splitter relative to the viewers, viewer 8 cannot see the lower display sector 12B, and viewer 10 cannot see the upper display sector 12A. If the viewers are competing, for example in a game with a split display, the viewers are free to adjust their lateral positions so long as they do not increase their angles of vision beyond their respective sectors by being too far laterally from the partition panel. The viewers can also adjusted their vertical positions relative to each other by tilting, i.e., inclining or declining the plane of the partition, as best illustrated in FIG. 16. The tiltability of the plane of the partition also allows adaptation of the screen splitter to a vertical range of video display dispositions, as best illustrated in FIG. 17. The video display screen could even be placed on the floor, but this would restrict viewer 10 to a prone position, which can be easily accomplished by lying on the stomach, back or a side.

Preferably the partition panel is trapezoidal with the parallel sides being generally forty inches and sixty-seven inches, and the height being generally fifty inches. These dimensions allow the screen splitter to be used with a wide range of video display screen widths. For example, a user can place the panel's short side juxtaposed laterally with television screens of forty inches or less in width, whereas the panel can be reversed for larger width screens, i.e., the long side against the wider screens.

Referring to FIGS. 4-7 and 11, a leg 4 is illustrated in this embodiment to be an assemblage of two leg segments 18 joined linearly together by a coupler 20. Oppositely mounted on respective segments are two brackets 22. As illustrated the preferred leg segments each have a uniform laterally transverse arcuate profile. They could also be flat, but the illustrated embodiment provides for greater strength and stability. Alternately they can be axially angled or tubular. The preferred coupler 20 is a sleeve having an axial through-channel 24 that is shaped and sized to frictionally receive the ends of two leg segments. In operation, when coupling two leg segments, the ends of the segments are forcibly inserted into opposite ends of the channel, preferably each insertion being about halfway into the channel. Once inserted the segment ends are held in place in the coupler preferably by friction, although alternately they may be snap-locked into place by detents.

Figure 1:
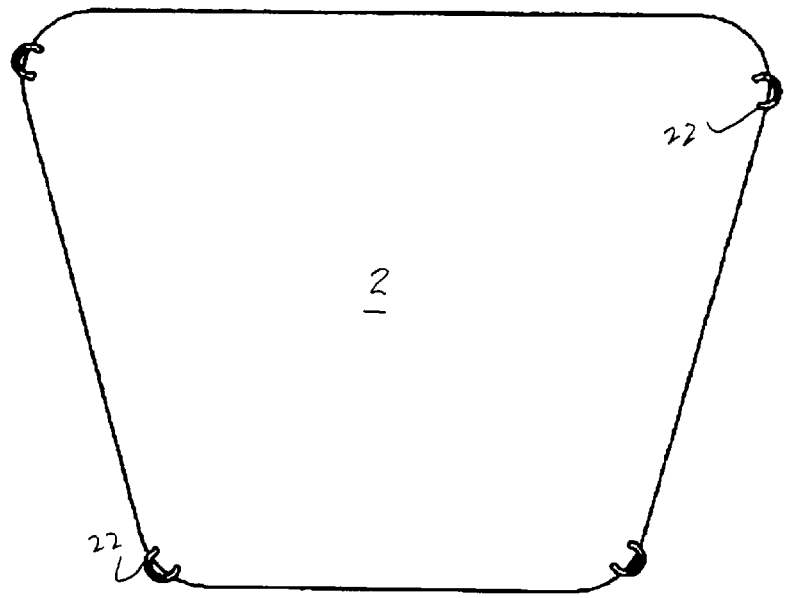
FIG. 1 is a top plan view of the invention in fully erected disposition.
Figure 2:
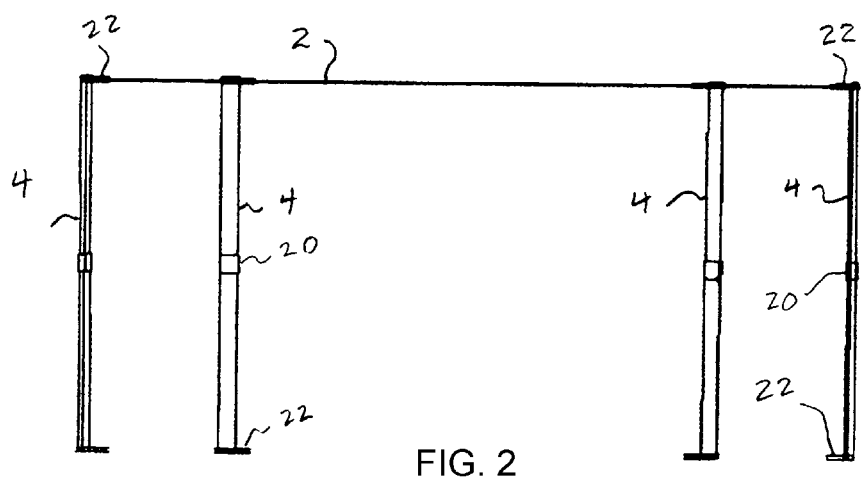
FIG. 2 is a front plan view of the invention in fully erected disposition.
Figure 3:
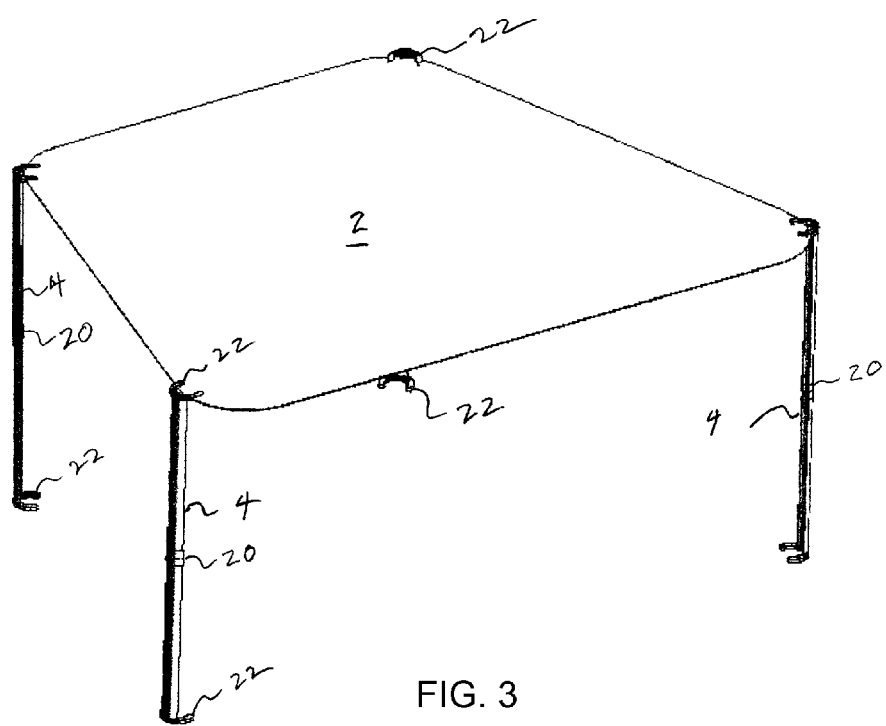
FIG. 3 is a pictorial view of the invention in fully erected disposition.
Figure 4:
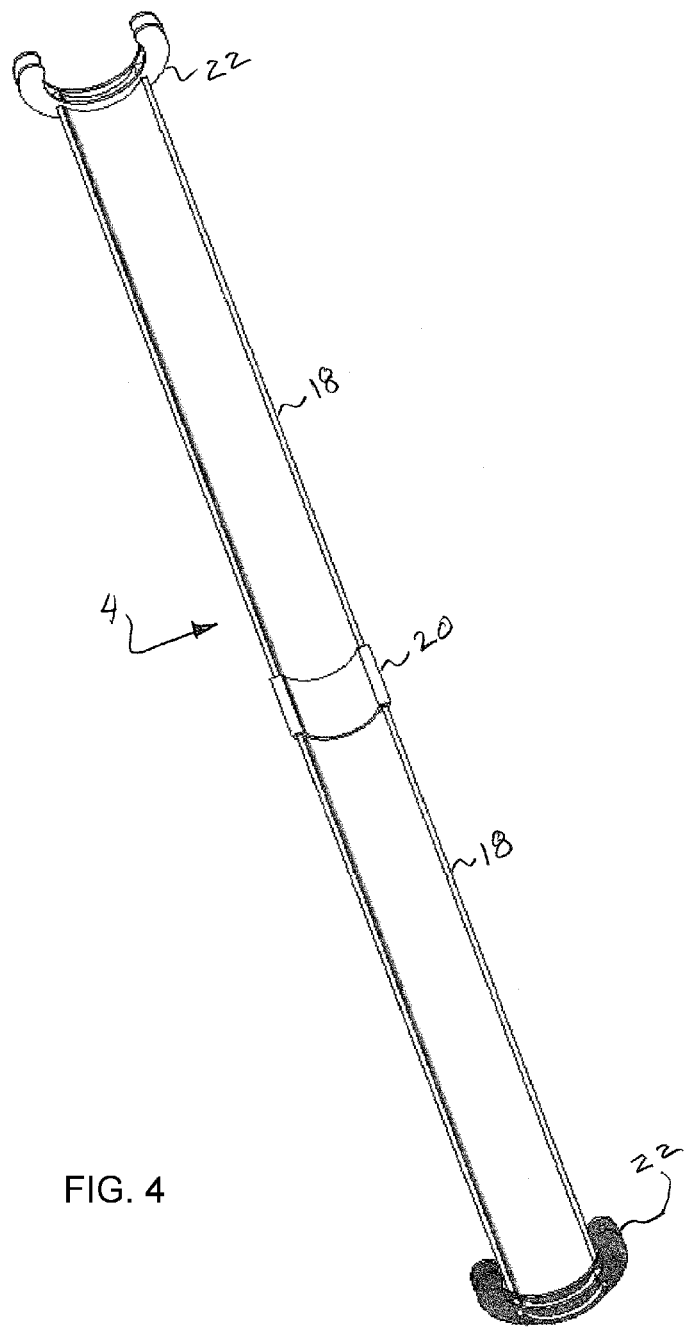
FIG. 4 is a pictorial view of an assembled support leg according to this invention.
Figure 6:
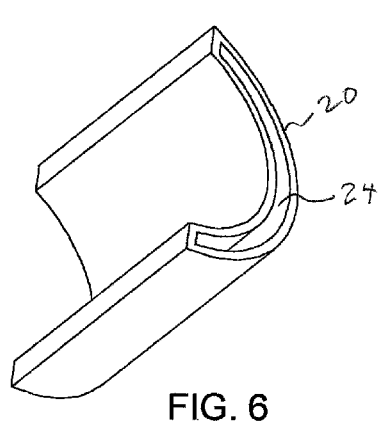
FIGS. 6 and 7 are pictorial and edgewise plan views, respectively, of a leg segment coupler according to this invention.
Figure 7:
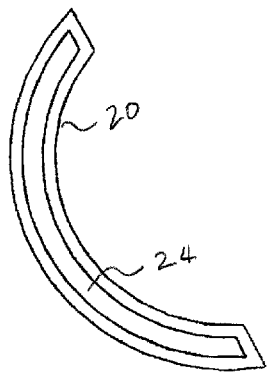
Figure 5:
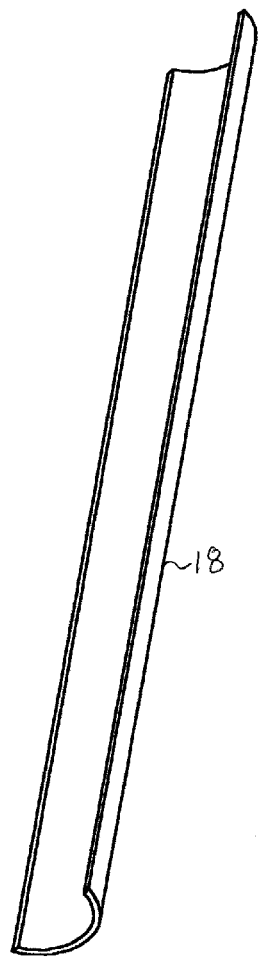
FIG. 5 is a pictorial view of a support leg segment according to this invention.
Figure 8:
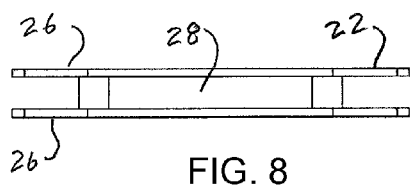
FIGS. 8-10 are two plan and one pictorial view of a bracket, according to this invention, that serves alternately as a leg foot, or as a bracket extending laterally from a leg to support a corner of a partition panel, FIG. 8 being a front plan view and FIG. 9 being a top plan view.
Figure 9:
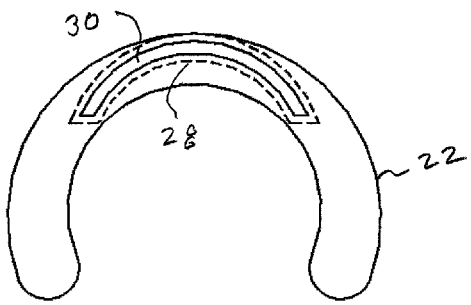
Figure 10:
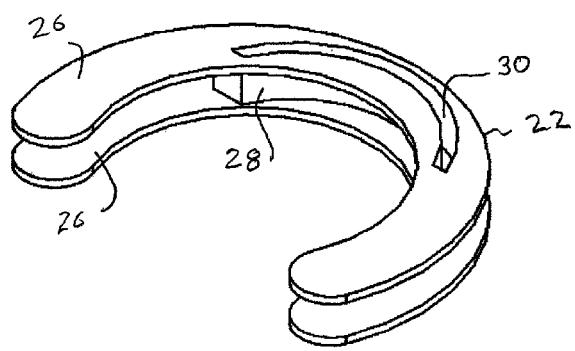
Figures 11, 12:
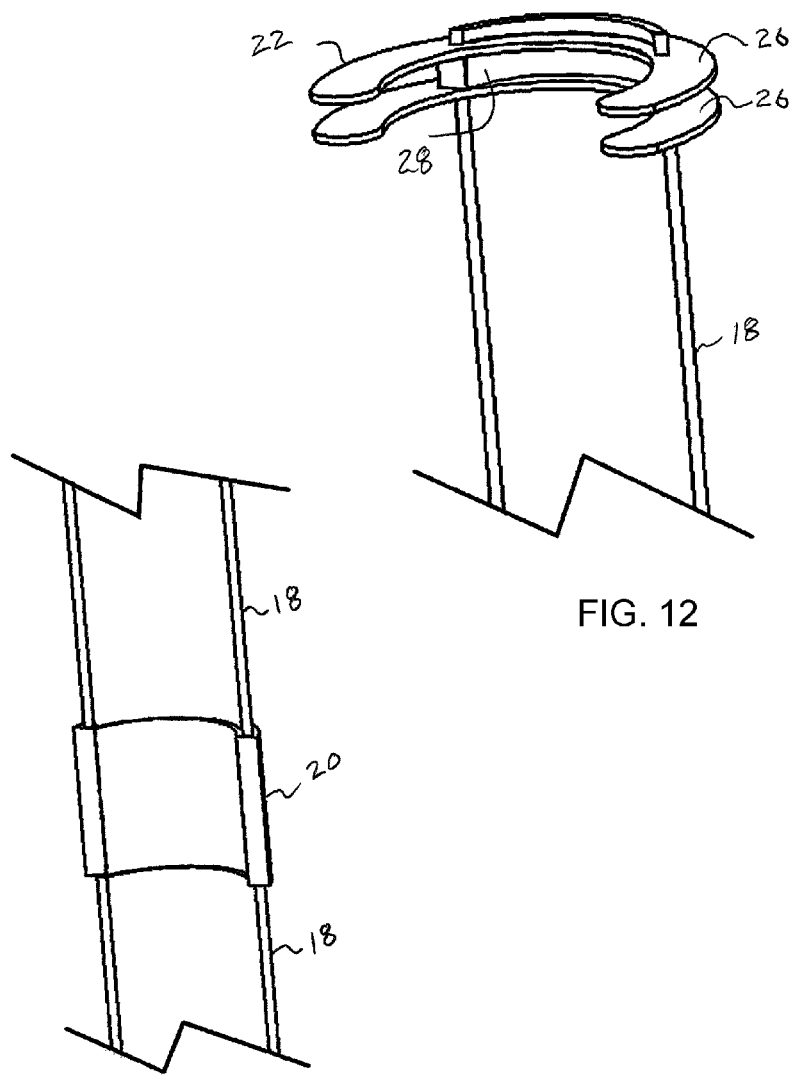
FIG. 11 is a detail pictorial view of two leg segments linearly joined by a coupler, as illustrated in FIGS. 6 and 7.
FIG. 12 is a detail pictorial view of a bracket (as illustrated in FIGS. 8-10) frictionally mounted onto a leg segment.

Referring to FIGS. 4, 8-10, and 12, the brackets 22 of this embodiment are illustrated to be c-shaped from a top plan view. As will be explained further below, the brackets are devices for attaching marginal portions of the panel 2 to their respective legs. Each bracket preferably has two uniformly c-shaped plates 26 held in parallel registration and spaced apart by a squat block 28 sandwiched between the crowns of the plates. The plates are preferably integral with the block, or otherwise affixed to opposite ends of the block. In this embodiment the block is disposed centrally in relation to the crown of the plates and is arcuate following the crown of the plates so as to not interfere with the bracketing of a partition panel corner as will be explained further below. The block and the plates define an arcuate through-slot 30 that follows the curve of the block. The through-slot 30 is shaped and sized to frictionally receive a leg segment 18 as best illustrated in FIG. 12. In operation when assembling a leg, two brackets 22 are frictionally mounted on the opposite ends of a leg 4, one bracket for bracketing preferably a corner of a partition panel to support the corner, and the other bracket for serving as a stabilizing foot for the leg, as best illustrated in FIGS. 3 and 4. The brackets contain and support a marginal portion of the panel, a corner or otherwise. It should be noted that the legs are vertically reversible because the bracket at either end of a leg can serve as a panel bracket or a leg foot.

Figure 13:
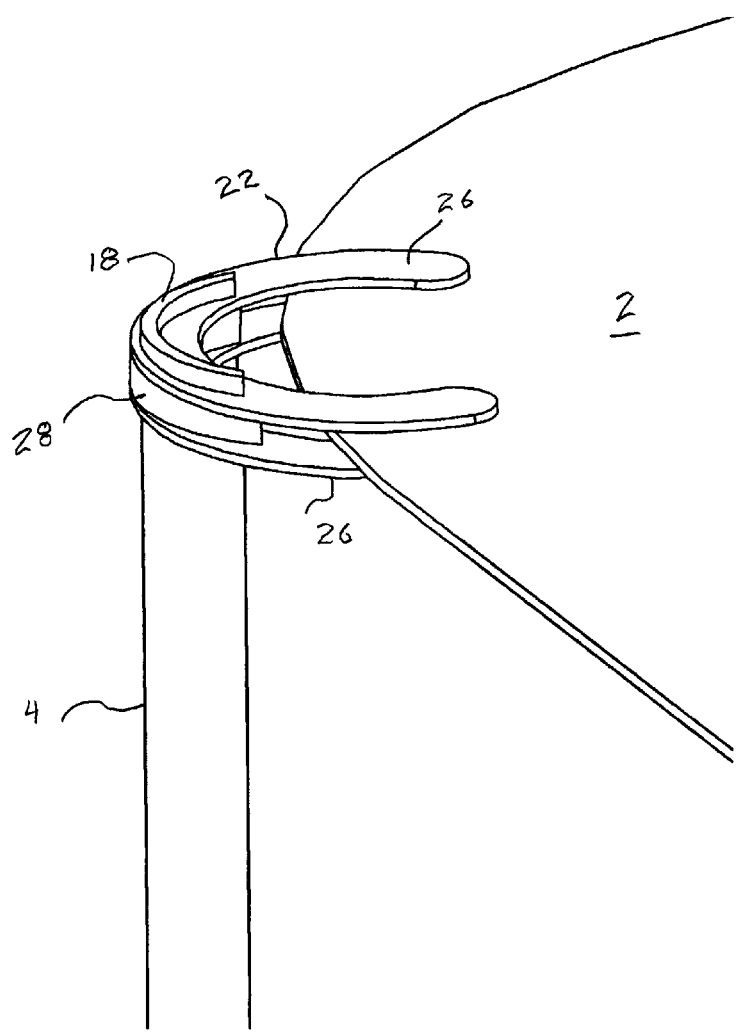
FIG. 13 is a detail pictorial view of a corner of a partition panel bracketed by a bracket and supported by a leg.

Referring to FIG. 13, once a leg 4 is assembled (two coupled leg segments 18 with two brackets 22 mounted on respective segments) it is ready to support a side or corner of a partition panel 2. In operation, a margin of the panel is inserted into one of the leg's brackets between the bracket's plates 26, and likewise other sides or corners of the panel are inserted into respective legs brackets until there are enough legs distributed around the panel to support it in a selected orientation, for example, horizontal or tilted as desired. In the preferred embodiment the disposition of a bracket relative to its leg is adjustable over a length of the leg. As illustrated the brackets are slidable along respective leg segments upon which they are mounted and held in place by friction. Thus a bracket holding a margin of the panel can be adjusted up or down its leg as desired to selectively set the orientation of the panel, as best illustrated in FIGS. 16 and 17. The containing function of the brackets is important because the resilient panel 2 is preferably biased to be flat, i.e. planar and tilting the panel by vertical adjustment of the brackets causes the panel to bend at some of the brackets. In the preferred embodiment, friction between the brackets and the leg segments hold the brackets in place on the segments. Alternately there can be one or more detent seats spaced along a segment that can mate with a detent projecting from a bracket to snap-lock the bracket at any of said one or more detent seats.

Figure 14:
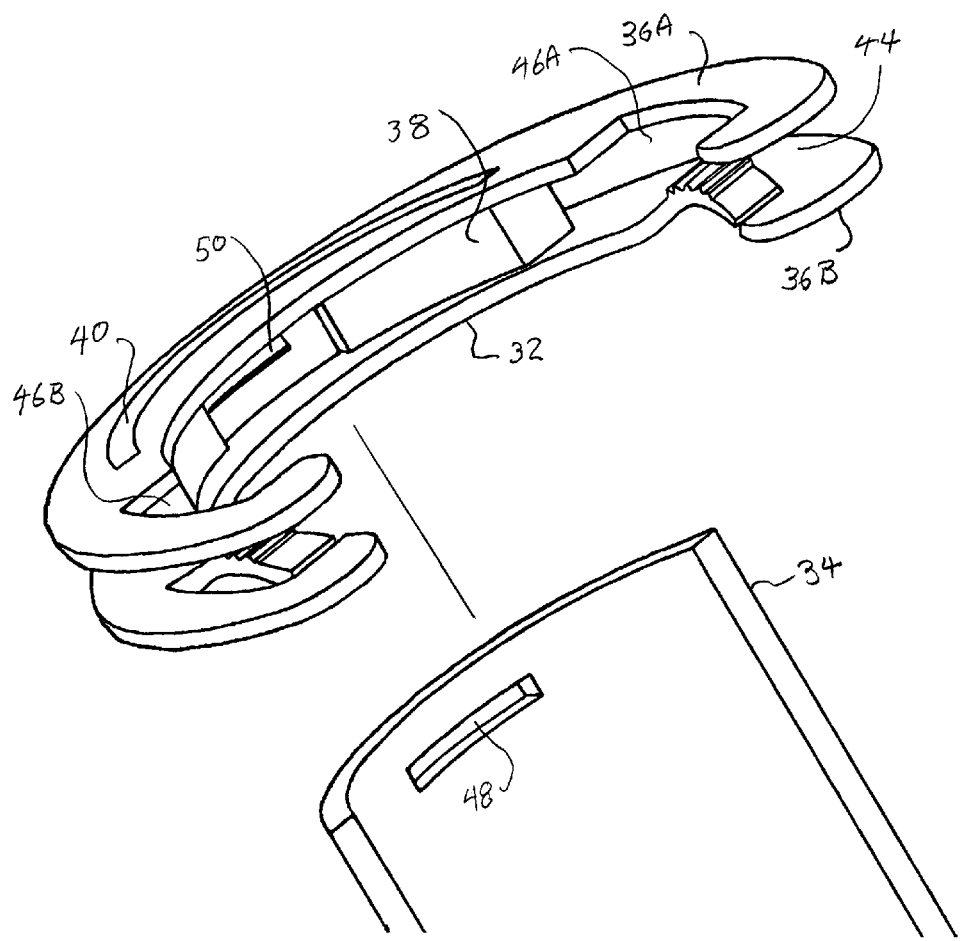
FIG. 14 is an exploded view of a bracket-leg segment assembly illustrating alternative embodiments of a bracket and a leg segment.

Referring to FIG. 14, alternative embodiments of a bracket 32 and a leg segment 34 are illustrated. The bracket is illustrated to be generally c-shaped from a top plan view. Each such bracket preferably has two uniformly profiled, c-shaped plates, 36A and 36B, held in parallel registration and spaced apart by a squat block 38 sandwiched between the crowns of the plates. The plates are preferably integral with the block, or otherwise affixed to opposite ends of the block. In this alternative embodiment the block is also disposed centrally in relation to the crown of the plates and is arcuate following the crown of the plates so as to not interfere with the bracketing of a partition panel corner. The block and the plates define an arcuate through-slot 40 that follows the curve of the block. The through-slot 40 is shaped and sized to frictionally receive the leg segment 34. One of the plates 36B defines two preferably serrated, resilient hump-like tongues, 42A and 42B, projecting from the plate 36B into the gap 44 between the two plates, thereby partially blocking the gap into which the margin of a partition panel 2 is inserted for support. The hump-like tongues are proximate to opposite ends of the plate such that a panel margin must ride over the tongues in order to be inserted into the plates' gap 44. Since the tongues are only affixed at one end to the plate 36B, they can be forcibly displaced to insert a panel margin, especially a margin including an expansion rod in a seam. Registered respectively with the tongues are two cutouts, 46A and 46B, defined by the other plate 36A. (The term "cutout" is not meant to indicate how the spaces 46A and 46B are actually made, but rather the way they look.) Once a panel margin has been inserted into the plates' gap 44 by forcibly displacing the tongues, the cutouts allow room for the resilient tongues to spring back and catch a portion of the panel in the cutouts to further secure the panel in the bracket 32. The alternative embodiment leg segment 34 also defines a through detent seat 48 that can mate with a detent 50 projecting from a wall of the slot 40 to further hold the bracket in relation to the segment.

It should be realized that this invention encompasses not just four legs supporting a partition panel, but also three legs or more than four legs, and not only a trapezoidal panel but also planar panels of any shape sufficient to provide the video display partitioning as describe herein.

This invention is particularly advantageous for mutliplayer video games that simultaneously display the game from the perspective of each player on respective sectors of a video screen. Limiting a player's field of vision to just his or her display sector allows the player to concentrate on just his or her portion of that game without being influenced by the other player's display. This encourages each player to try harder because each player is not visually aware of what the other player is doing. This keeps players from relaxing during the game as they might if they can see that they are way ahead, or from giving up if they can see that they are too far behind to catch up. The limited views encourages better results and provides more excitement for the players since the outcome of the game remains in doubt until the game is finished.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

What is claimed is:

1. A video display screen splitter comprising:
   (a) a resiliently bendable planar panel including a side that when juxtaposed laterally with the screen traverses the width of the screen;
   (b) a plurality of legs for supporting the panel, each leg further comprising a bracket for containing and supporting a marginal portion of the panel, the disposition of the bracket relative to the leg being adjustable over a length of said each leg, said bracket comprising:
      (1) two spaced apart plates held in parallel registration, the gap between the plates being sized to receive and contain a marginal portion of the panel, and
      (2) a block sandwiched between the plates spacing them apart, the block and plates defining a through hole through which a leg extends to mount the bracket on the leg;
   (c) wherein the panel includes sufficient area and form to partition the display into two distinct viewable areas from the visual perspectives of viewers of the screen, one viewable area above the panel and the other viewable area below the panel, whenever the side is laterally juxtaposed with the screen.

2. The screen splitter according to claim 1 wherein a leg has a laterally transverse non-flat profile and the through hole conforms to said profile.

3. The screen splitter according to claim 1 wherein a bracket mounted on a foot end of a leg can function as the leg's foot.

4. The screen splitter according to claim 1 wherein the disposition of the bracket relative to the leg is maintained by friction.

5. The screen splitter according to claim 1 wherein the disposition of the bracket relative to the leg is maintained by one or more detents distributed along a length of the leg.

6. The screen splitter according to claim 1 wherein the legs can be dis-assembled for storage.

7. The screen splitter according to claim 1 wherein the panel is trapezoidal in broad profile.

8. A video display screen splitter comprising:
   (a) a foldable panel;
   (b) a bias urging the panel to be unfolded and planar, the bias comprising a bendable rod including a memory urging the rod to be straight, the rod being bent generally fully around the panel and affixed to a margin of the panel;
   (c) a plurality of vertical legs for supporting the panel in a generally horizontal disposition wherein a side of the panel is juxtaposed with and across the video display screen;
   (d) the panel further comprising sufficient area and form to partition the display into two distinct viewable areas from the visual perspectives of viewers of the screen, one viewable area above the panel and the other viewable area below the panel, whenever the side is horizontally juxtaposed with the screen; and
   (e) wherein the rod and panel can be twisted and folded by a user into a compact form for storage.

9. The screen splitter according to claim 8 wherein the rod is affixed to the margin of the panel by being disposed in a marginal seam of the panel.

10. The screen splitter according to claim 8 wherein the legs can be dis-assembled for storage.

11. The screen splitter according to claim 8 wherein the panel is trapezoidal in broad profile.

12. A video display screen splitter comprising:
   (a) a foldable panel;
   (b) a bias urging the panel to be unfolded and planar, the bias comprising a bendable rod including a memory urging the rod to be straight, the rod being bent generally fully around the panel and affixed to a margin of the panel;
   (c) a plurality of vertical legs for supporting the panel in a generally horizontal disposition wherein a side of the panel is juxtaposed with and across the video display screen;
   (d) the panel further comprising sufficient area and form to partition the display into two distinct viewable areas from the visual perspectives of viewers of the screen, one viewable area above the panel and the other viewable area below the panel, whenever the side is horizontally juxtaposed with the screen;
   (e) each leg further comprising a bracket for containing and supporting a marginal portion of the panel, the disposition of the bracket relative to said each leg being adjustable over a length of the leg; and
   (f) wherein the rod and panel can be twisted and folded by a user into a compact form for storage.

13. The screen splitter according to claim 12 wherein at least one of the leg brackets comprises two spaced apart plates held in parallel registration, the gap between the plates being sized to receive and contain a marginal portion of the panel.

14. The screen splitter according to claim 13 wherein at least one leg further comprises a second bracket disposed at an end of said leg, said end being remote for the panel, said second bracket being a foot of said leg.

15. The screen splitter according to claim 12 wherein the selected disposition of the bracket relative to the leg is maintained by friction.

16. The screen splitter according to claim 12 wherein the selected disposition of the bracket relative to the leg is maintained by one or more detents distributed along a length of the leg.

17. The screen splitter according to claim 12 wherein the legs can be dis-assembled for storage.

18. The screen splitter according to claim 12 wherein the panel is trapezoidal in broad profile.

* * * * *